March 13, 1956     W. L. WALTON     2,738,171
LOCOMOTIVE CAB HEATER AND DEFROSTER
Filed March 11, 1953     2 Sheets-Sheet 1
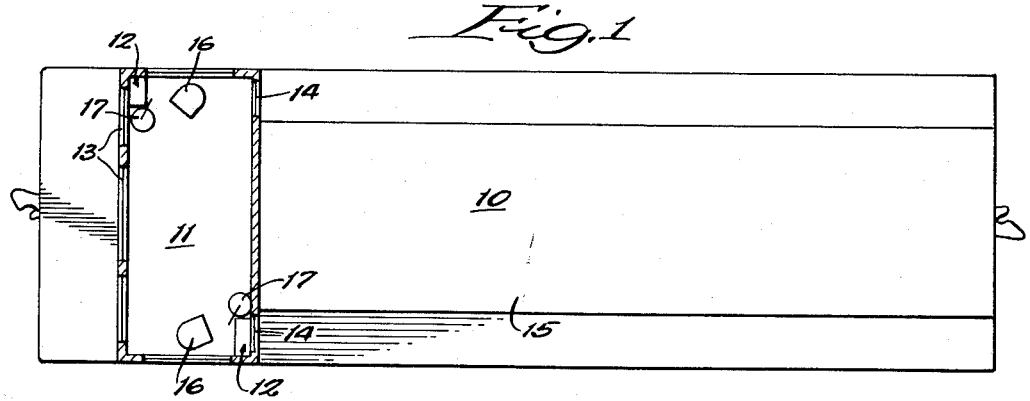
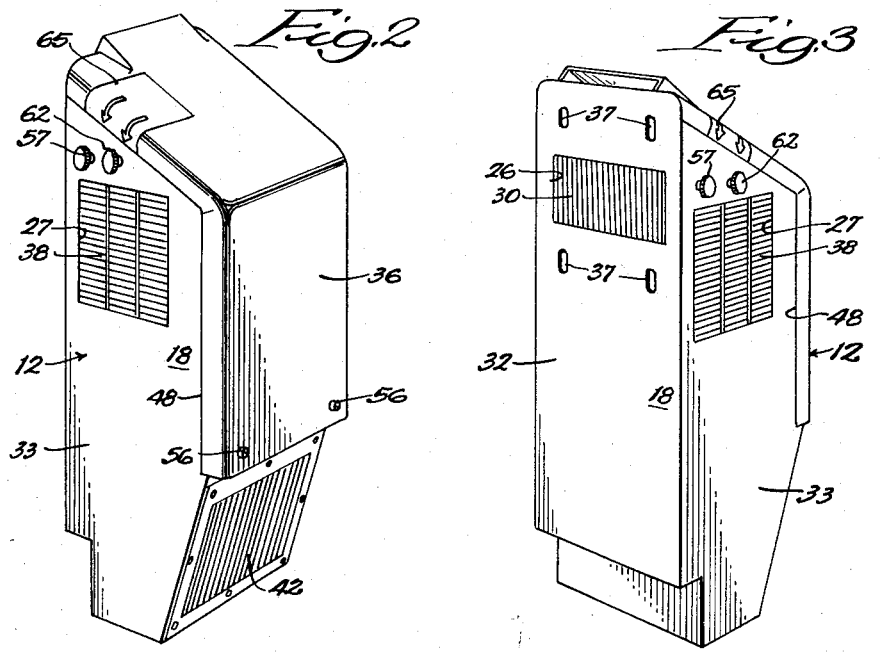
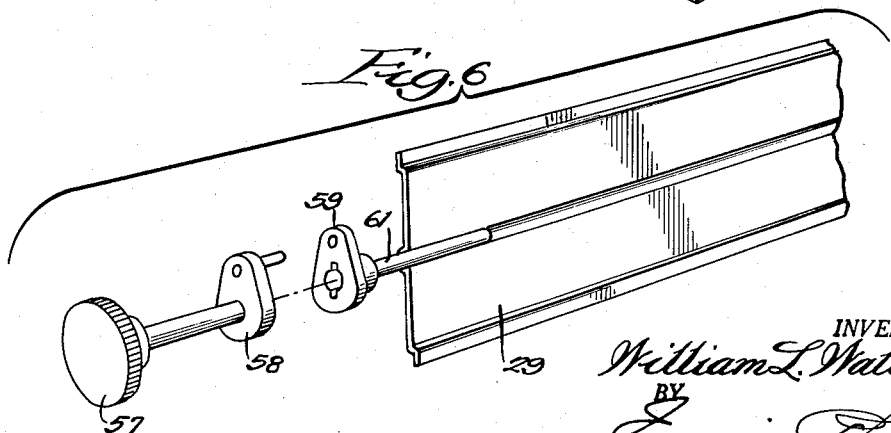
INVENTOR:
William L. Walton
BY
*Edwin Phelps*
ATTORNEY.

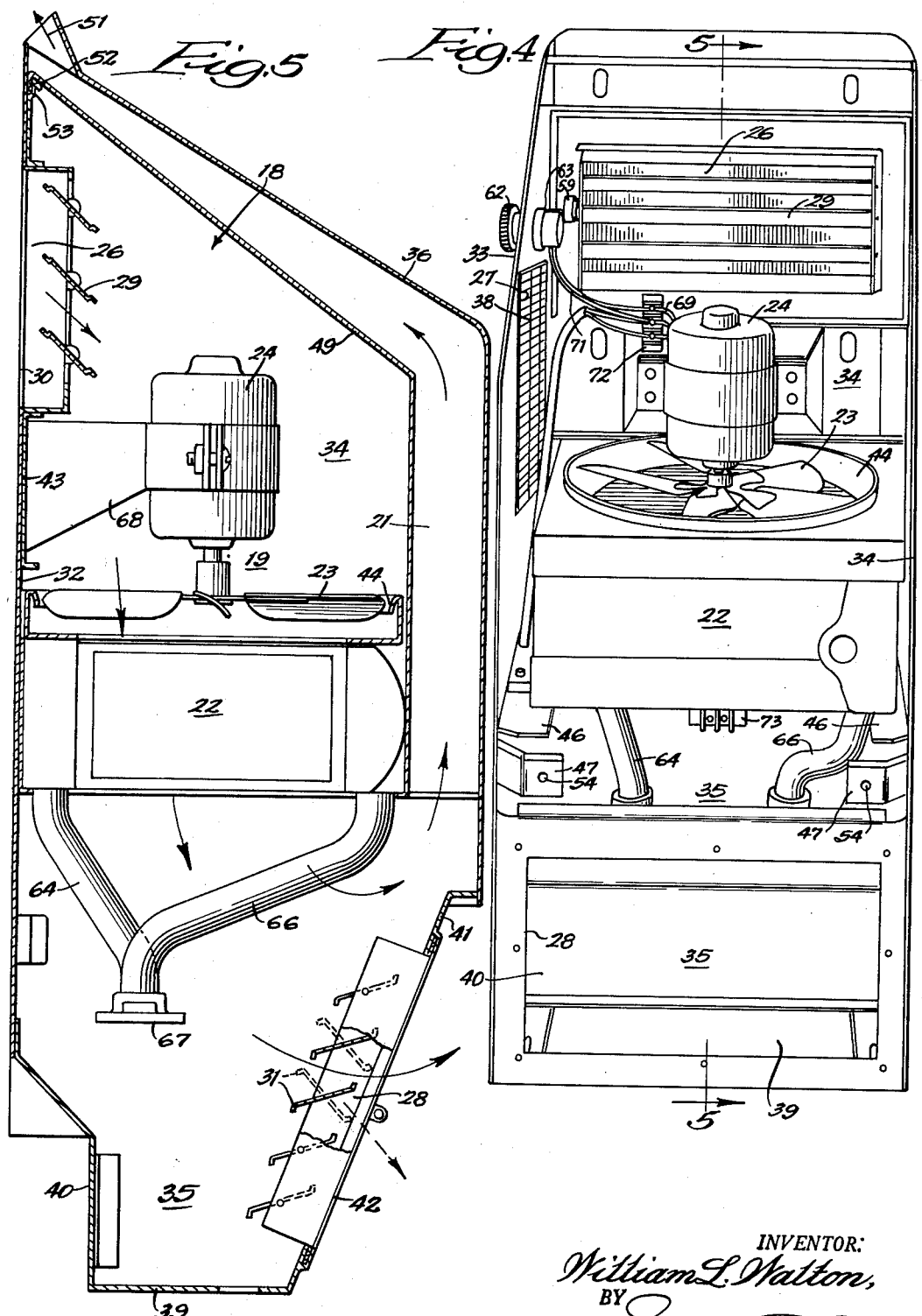

United States Patent Office 2,738,171
Patented Mar. 13, 1956

2,738,171

LOCOMOTIVE CAB HEATER AND DEFROSTER

William L. Walton, Racine, Wis., assignor to Young Radiator Company, Racine, Wis., a corporation of Wisconsin Application March 11, 1953, Serial No. 341,669

1 Claim. (Cl. 257—137)

This invention relates to unit heaters particularly adapted for use in heating the cabs of automotive equipment and especially diesel-powered electric locomotives of the type presently being used extensively on the railroads.

The cab, in this type railroad locomotive, is very limited in space. Moreover, the location and the arrangement of the windows, the control mechanism, and seats for the crew members of necessity are fixedly determined by the requirements essential to the effective use of the locomotive incident to the movement of a train of cars locally and long distance. In the colder climates it is imperative to provide heat for the comfort of the crew and for the defrosting of the windows. Because of the aforesaid limited space and the fixed arrangement of the windows, the operator's seat, and the control mechanism, a heater for achieving this dual objective of space heating and window defrosting must be very compact, easy to install adjacent the windows and the engineer's seat and, when installed, afford subsequent ready access to the interior of the unit. Moreover, the heater controls must be so arranged as to permit the regulation of the amount and the direction of the heated air currents for both cab space and window defrosting.

The main objects of this invention, therefore, are to provide an improved form, construction, and arrangement of combination space and window-defrosting heating unit for use in locomotive cabs; to provide a heating unit of this kind having an improved housing affording a compact arrangement of a heating coil, the motor-fan disposition, and the channels for directing heated air into the cab area and against the engineer's outlook windows; to provide an improved housing closure arrangement adapted for ready removal and replacement so as to afford convenient access to the interior of the housing; and to provide an improved locomotive cab-space and window defrosting heater of this kind which is so simple in its structure that it is capable of economical manufacture, quick assembly, facile installation, and ready accessibility for subsequent repair or replacement.

In the accompanying drawings

Fig. 1 is a miniature, diagrammatic plan of a Dieselpowered electric railroad locomotive showing the arrangement of the cab, wherein is located a space and window-defrosting heater embodying this invention;

Fig. 2 is a perspective view, from the back, i.e. inside the cab, of a space and window-defrosting heater embodying this invention;

Fig. 3 is an opposite or front perspective view of the same;

Fig. 4 is an enlarged, rear perspective view of this improved cab and window-defrosting heater with the top-back closure removed, thereby illustrating the accessibility which the removal of such closure affords to the interior mechanism of the heater;

Fig. 5 is a vertical, cross sectional view of the same with the closure in place, as viewed from the plane of the line 5—5 of Fig. 4; and Fig. 6 is an enlarged, exploded perspective view showing the connection of one of the control knobs for one of the register dampers.

The essential concept of this invention involves a housing of elongated vertical dimension and of rectangular cross section with an outside fresh air inlet and an inside auxiliary air inlet respectively near the top of the front and one side, and a heated air outlet at the lower rear communicatively connected by an air-flow chamber wherein is axially mounted an associated heating unit and motor-driven fan, the housing being provided with a removable partitioned and integrated top and back closure affording an air flow channel leading from the chamber below the heating unit to a defrosting air outlet at the upper front edge of the removable closure, suitable damper mechanisms being provided for regulating the heated air flow through the chamber and the channel.

A diesel-powered, electric railroad locomotive 10 for use in the cab 11 of which this improved space and window-defrosting heater 12 is especially designed, mounts the cab 11 at one end. Along the front of the cab 11 are windows 13 and at the rear are windows 14 adjacent the corners, outwardly of the power unit 15 of the locomotive. An operator's seat 16 and the usual control equipment 17 are located in the cab at diagonally opposite corners directly in front of the respective windows 13 and 14.

The cab 11 of necessity is small and compact. The operator's seat 16 and the control equipment 17 must be so located in these corners that the operator may have clear vision through the windows 13 and 14 forward and aft of the locomotive and along the line of cars that are being moved.

A cab and window-defrosting heater 12, for use in cabs of this kind, must meet three requirements. First, it must be very compact so as to fit in the cab corner between the operator's seat 16 and the control equipment 17 and the adjacent side and front of the cab 11. Secondly, it must be so arranged that the heater controls are closely adjacent to the seat 16 and control equipment 17 and generally operable with the right hand. Thirdly, the heater 12 must be so constructed that the interior parts are readily accessible for making connections, adjustments, when being installed, and later if and when repairs or replacements become necessary.

The hereinshown adaptation of this improved locomotive cab-space and window-defrosting heater 12 comprises, a housing 18 providing a main heating and airflow chamber 19 and a defrosting air-flow channel 21 (see Fig. 4) with a heating unit 22 and an axially-disposed fan 23 and motor 24 located in the chamber 19 intermediate the air inlets 26 and 27 and the air outlet 28, the air flow through the chamber 19 and the channel 21 being controlled by the respective damper mechanisms 29 and 31.

The housing 18 is an assembly of sheet metal stampings appropriately shaped to provide overlapping perimetrical flanges to permit bonding of the several parts together to form the main part with front panel 32, side panels 33 and 34, a base section 35, and a removable top-back closure section 36.

The front panel 32 is designed to fit up against the inner front wall of the engine cab 11 directly below the corner window 13 or 14. The fresh air inlet opening 26, protected by a grille 30, registers with a comparable opening in the front wall of the engine cab 11. Apertures 37 (see Fig. 3) are suitably located to register with similar apertures in the cab wall and to receive bolts (not shown) to removably anchor the heater 12 to the aforesaid cab wall.

The side panels 32 and 33 are identical except for the air inlet opening 27 formed near the upper end of the side panel 32. This air inlet 27 is protected by a grille 38.

The base section 35 is formed by a special bottom stamping 39 fitting between and anchored to the lower ends of the housing side panels 32 and 33. The forward wall of this bottom section 39 is offset at 40 to accommodate some of the piping within the cab. The rear wall 41 is disposed at an upward incline. The major portion of this wall is cut out to provide the air outlet 28 covered by a removable grille 42 mounting the damper mechanism 31.

Interiorly of the housing 18 is a channel-shaped, fan-supporting reinforcement 43 (see Fig. 5) on the front 32, a fan-shroud 44, heater-supporting ledge members 46 (see Fig. 4) and top-back closure anchoring brackets 47.

The removable top and back section closure 36 is a single stamping with the top section angularly-inclined with respect to the vertically-disposed back section. Flanges formed along the lateral edges of this top-back closure overlap the edges of the side panels 32 and 33. Bonded along its edges within the top-back closure 36 is a partition 49 spaced inwardly to form the defrosting air channel 21. At its extreme upper end the top part of the closure 36 is offset to form a funnel-like discharge opening 51 for directing the defrosting air current against the cab windows 13 or 14. Along the back section the partition 49 is parallel but along the top section the partition is inclined upwardly toward the discharge opening 51. The upper end of the partition 49 is formed with a hook 52 which fits over a bracket 53 secured along the top edge of the front panel 32. These interfitting parts 52 and 53 serve to lock the top-back closure 36 in place along its upper edge. Adjacent the bottom edge of the top-back closure 36 are apertures registering with apertures 54 in the brackets 47 (see Fig. 4) for the reception of screws 56 (see Fig. 2) for completing the locking of the top-back closure 36 in position on the housing 18.

The damper mechanisms 29 and 31 are conventional structures. Each is provided with suitable operating means for adjusting the position of the damper panels between fully-closed and fully-open positions. The operating means for the damper mechanism 29 involves a knob 57 connected to one of a pair of eccentrics 58 and 59, the latter being connected to one of the panel trunnion shafts 61. This arrangement permits a swing of the damper panels through an angle of approximately 180 degrees. This knob 57 is journaled on the housing side panel 33 near the forward upper edge thereof. Adjacent thereto is a second knob 62 which is connected to a conventional rheostat 63 (see Fig. 4) for controlling the speed of the motor 24. Associated with these knobs 59 and 62 is an escutcheon 65 with appropriate legends thereon.

The operating means for the damper mechanism 31 is not shown. However, it effects approximately 180 degree swing of the damper panels between opposite closed positions so that the air may be variously directed downward, upward, or inbetween into the cab, and incidentally control the amount of heated air that may be directed up through the channel 21.

The heating unit 22 is a conventional, fin-tube construction secured within a frame slidable into and out of position on the supporting ledges 46 to occupy an axial position within the housing chamber 19. Conduits 64 and 66 lead from the opposite headers of the heater to a point within the lower part of the chamber 19. On these contiguous ends are mounted connecting flanges 67 which, it will be observed from Fig. 5, are easily accessible, when the top-back closure 36 is removed, for connection to or disconnection from leads to a source of water or steam.

The fan 23 and motor 24 are axially arranged of each other in the upper part of the chamber 19 above the heating unit 22. The motor is mounted on a bracket 68 secured to the channel-shaped reinforcement 43 so as to dispose the fan within the shroud 44. The motor 24 is connected in circuit with a rheostat 63 through the medium of electrical cables 69 and 71 and a terminal block 72 and with a source of electric power through the cables (not shown) and a terminal block 73.

The herein shown adaptation of a cab-heater and window-defrosting heater, embodying this invention, is arranged and operated as follows:

As indicated in Fig. 1 two such heaters are generally located in diagonal corners of the engine cab 11, adjacent the respective cab corner windows 13 and 14. Each is bolted to the cab wall with the fresh air inlet 26 opening to the outside of the cab 11 and with the defrosting discharge funnel 51 located adjacent the lower edge of the respective windows 13 and 14.

Access to the interior of the housing for locating and securing the anchoring bolts, making appropriate connections to the conduit plates 67, and the terminal block 73 is made extremely facile by the removal of the top-back closure 36. This requires only the removing of the two screws 56 and lifting the top-back closure to retract the hook 52 from the bracket 53. Once these connections are made and the top-back closure 36 replaced the heater is ready to put into use.

Starting the motor results in a flow of air being drawn through the chamber 19 from the inlets 26 and 27 (the relative amount being determined by the positioning of the damper mechanism 29). Positioning the damper mechanism 31 determines how much of the heated air is directed in its flow out into the cab 11 through the outlet 28 and/or up through the channel 21 to the window defrosting outlet 51. The speed of the motor 22 determines the velocity of that air flow.

I claim:

A heater unit for use in the operator's cab of a diesel-type locomotive wherein the cab is of narrow rectangular shape defined by flat vertical walls and located at one end of the locomotive transversely thereof the upper portion of which walls are glass windows with the operator's seat and locomotive control equipment positioned in one corner of the cab to afford the operator observation through the windows in opposite directions along one side of the locomotive, one of the cab walls being cut-out to provide an air inlet, the heater unit comprising, a housing formed with a vertical flat front wall extending the full length of the unit, spaced vertical flat side walls, a removable one-piece top-back closure, and a supporting base section having a nearly-vertical wall extending upwardly above and abutting the lower end of said top-back closure, the front wall having a fresh-air inlet adjacent its upper end and equipped with means for anchoring the housing to a vertical cab wall below the window section with the air-inlet registering with the air inlet in the cab wall, the top-back closure having its portions angulated to incline the top portion upwardly from the vertical back portion to the front wall for juncture with the upper end of the housing front wall at a point directly above the air-inlet, the closure top portion having a defrosting air-outlet formed at the juncture with the front wall, the base section having an air-outlet formed in said vertical wall, an associated heating core and motor-driven fan arranged in the housing intermediate the front wall air-inlet and the base section air-outlet for moving a column of heated air downwardly through the housing, a partition secured to the inside of the top-back closure in spaced relation thereto and extending therealong from the defrosting air-outlet to a point below and at one side of the heating core and above said base section vertical wall and top-back closure juncture to provide a warm-air channel leading to the defrosting air-outlet, means for detachably securing the top-back closure to the other housing walls, and means for regulating the air flow through the housing air-inlet and through the base-section vertical-wall air-outlet.

References Cited in the file of this patent

UNITED STATES PATENTS

| | | |
|---|---|---|
| 2,045,044 | Modine | June 23, 1936 |
| 2,304,642 | Hans | Dec. 8, 1942 |
| 2,304,643 | Hans | Dec. 8, 1942 |
| 2,488,278 | Findley | Nov. 15, 1949 |
| 2,621,857 | Wixon | Dec. 16, 1952 |
| 2,683,025 | Matulaitis | July 6, 1954 |